(12) United States Patent
Maddocks et al.

(10) Patent No.: US 12,322,855 B2
(45) Date of Patent: Jun. 3, 2025

(54) MOUNTING SYSTEM FOR AN ANTENNA ASSEMBLY

(71) Applicant: Global Invacom Ltd, Stevenage (GB)

(72) Inventors: Adrian Maddocks, Stevenage (GB); Gary McDonald, Stevenage (GB)

(73) Assignee: Global Invacom Limited, Stevenage (GB)

( * ) Notice: Subject to any disclaimer, the term of this patent is extended or adjusted under 35 U.S.C. 154(b) by 0 days.

(21) Appl. No.: 18/265,564

(22) PCT Filed: Nov. 26, 2021

(86) PCT No.: PCT/GB2021/053085
§ 371 (c)(1),
(2) Date: Jun. 6, 2023

(87) PCT Pub. No.: WO2022/123212
PCT Pub. Date: Jun. 16, 2022

(65) Prior Publication Data
US 2024/0136699 A1  Apr. 25, 2024

(30) Foreign Application Priority Data
Dec. 10, 2020  (GB) .................................. 2019480

(51) Int. Cl.
*H01Q 1/12*  (2006.01)
(52) U.S. Cl.
CPC ......... *H01Q 1/1228* (2013.01); *H01Q 1/1221* (2013.01); *H01Q 1/125* (2013.01)

(58) Field of Classification Search
CPC ...... H01Q 1/12; H01Q 1/1221; H01Q 1/1228; H01Q 1/125
See application file for complete search history.

(56) References Cited

U.S. PATENT DOCUMENTS

| | | | |
|---|---|---|---|
| 6,232,928 B1 | 5/2001 | Zimmerman et al. | |
| 2007/0210978 A1 | 9/2007 | Zihlman | |
| 2010/0127947 A1 | 5/2010 | Fruh et al. | |
| 2013/0134271 A1 | 5/2013 | Lee et al. | |
| 2016/0294036 A1 | 10/2016 | Christie | |
| 2016/0365619 A1 * | 12/2016 | Hamm | F16M 13/02 |

FOREIGN PATENT DOCUMENTS

| | | | | |
|---|---|---|---|---|
| CN | 2927340 Y | * | 7/2007 | |
| CN | 111755800 A | | 10/2020 | |
| FR | 2818810 A1 | | 6/2002 | |
| FR | 2836287 A1 | * | 8/2003 | ......... H01Q 1/1207 |
| JP | H1022713 A | | 1/1998 | |
| WO | WO2014132091 A1 | * | 9/2014 | |

* cited by examiner

*Primary Examiner* — Hoang V Nguyen
(74) *Attorney, Agent, or Firm* — GableGotwals

(57) ABSTRACT

An apparatus and a method for installing an antenna assembly to a support member at a required position via at least one clamping means to locate and engage with the support member to secure the antenna assembly. The assembly includes a locating portion to locate with the support member prior to engagement of the at least one clamping means to substantially retain the at least one clamping means and/or antenna assembly in the required location with respect to the support member, whilst the at least one clamping means is engageably operated to the support member and thereby ensure more accurate and efficient operation of the antenna assembly during subsequent use.

11 Claims, 2 Drawing Sheets

MOUNTING SYSTEM FOR AN ANTENNA ASSEMBLY

CROSS-REFERENCE TO RELATED APPLICATIONS

Figure 1A:
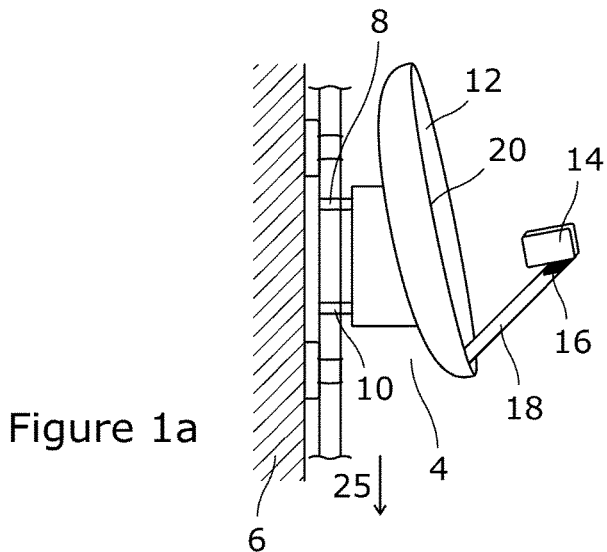

This United States application is the National Phase of PCT Application No. PCT/GB2021/053085 filed 26 Nov. 2021, which claims priority to British Patent Application No. 2019480.9 filed 10 Dec. 2020 which are incorporated herein by reference.

The invention to which this application relates is a mounting system for use particularly, although not necessarily exclusively, in the mounting of an antenna to a support surface, such as a substantially vertical wall surface, or the ground.

The provision of an antenna assembly which is capable of receiving, or receiving and transmitting, data signals is well known and it is this type of apparatus to which the invention relates. The data signals are typically transmitted by satellite broadcast systems to a number of said antenna assemblies. Each antenna assembly typically includes an antenna dish and at each of the premises where the antenna assembly is provided to receive the data signals, the antenna needs to be mounted and directed towards the location from which the data signals can best be received from one or more satellites. Conventionally, the antenna assembly, in addition to the antenna dish, includes a bracket on which the dish is located and an arm is provided on which a low noise block (LNB) and/or other data processing apparatus is located so as to receive and process data signals reflected from the front surface of the antenna dish. The dish and arm are in turn located on a pole via the bracket and the pole is located on a plate fastened to the wall or can be secured to the ground. The received data signals are then passed from the data processing means for further processing by apparatus, such as a set top box, PC or other apparatus within the premises, to allow the generation of audio and/or video and/or data services to the end user. When the apparatus is capable of transmitting data signals, the data signals are passed from the data processing means and transmitted.

Conventionally, the antenna assembly is first located on the pole by using one or a series of clamps but a common problem is that while trying to install the assembly onto the pole, the clamps will slide down the pole from the required position and, due to the fact that the installer will be supporting the weight of the antenna assembly at the same time, it can be difficult, if not impossible, for the installer to prevent the movement of the clamps and movement of the antenna assembly to an incorrect position from occurring. This problem is increased when one considers that the installer is often carrying the weight of the antenna assembly whilst being on a ladder at a significant height from the ground, so that any rapid movement to prevent the clamps from sliding down the pole is difficult. Furthermore, as the mounting bracket location is at the rear face of the antenna, this means that the whole weight of the antenna assembly is therefore required to be supported by the installer at the required position as they are fixing the same in position.

As a result, it is found that, in practice, the performance of the fixing operation can be difficult to achieve and is physically demanding on the installer, especially when one considers that the installation may be undertaken in environmentally unfriendly conditions, such as in wind and rain. This represents a significant risk to the safety of the installer, both due to the weight of the apparatus and also the particular manner in which the apparatus needs to be supported. Moreover, the height at which the installer is above ground on a ladder when installing the antenna assembly as well as the time constraints which may be imposed for the time taken for installation, can add further pressure to the installer when performing the installation. It therefore results in the antenna assembly being located at a less than optimum position for subsequent data reception.

It is therefore an aim of the present invention to provide an antenna assembly in a form which allows the location of the antenna assembly on a support means, such as a pole, to be achieved more accurately and efficiently, whilst ensuring the safety of the installer during the process.

In a first aspect of the invention, there is provided apparatus including an antenna assembly including at least one clamping means to secure the antenna assembly to a support member at a required position, said at least one clamping means provided to locate and engage with the support member to secure the antenna assembly and wherein the antenna assembly includes a locating portion to locate with the support member to substantially retain the at least one clamping means and/or antenna assembly in the required location with respect to the support member, whilst the said at least one clamping means is operated to so as to be engaged to the support member.

Typically, with the locating portion in position with the support member, the at least one clamping means can then be clamped into fixed engagement with the support member to fix the antenna assembly in position on the support member.

Typically the said locating portion, once the clamping means are engaged in position, is no longer required to provide any locating or engaging function for the antenna assembly and therefore may be provided to only act as a temporary location means during the clamping operation.

In one embodiment said locating portion is provided of a form so as to engage with an end of the support member, typically the top end, so as to prevent the at least one clamping means and/or antenna assembly from sliding down the support member under the influence of gravity.

Thus, as the installer can be certain that when the locating portion is located with the support member the antenna assembly will not move downwardly with respect to the support member, they can have increased confidence and ability to release the antenna assembly during the engagement of the clamping means so as to securely clamp the clamping means in position on the support member. This therefore releases the burden of the weight of the antenna assembly during the installation of the same in position on the support member.

Typically the position of the locating portion with respect to the support member is selected so as to ensure that the antenna assembly is located at the required location on the support member when the locating portion is located with the support member.

In one embodiment the provision of the locating portion on the support member is such that the antenna assembly and the mounting means, in the form of a bracket will naturally sit at the correct angle for presentation and engagement of the antenna assembly to the support member.

In one embodiment the support member is a pole.

In one embodiment the locating portion is substantially hook shaped.

In one embodiment the support member has an aperture with which the locating portion locates.

In one embodiment the aperture is provided at an end of the support member.

Typically a plurality of clamping means are provided at spaced intervals along the pole and to be engaged therewith.

In a further aspect of the invention there is provided a method for installing an antenna assembly on a support member, said method including the step of placing at least one clamping means of the antenna assembly in position on the support member, operating the said at least one clamping means so as to clamp the antenna assembly in engagement with the support member and wherein at least prior to engaging the clamping means with the support member, a locating portion of the antenna assembly is located on said support member such as to locate and retain the antenna assembly in location with the support member.

Typically, with the locating portion locating the antenna assembly and support member in relative fixed positions, the clamping means are operated to engage and fix the antenna assembly to the support member.

Typically, the installer, when presenting the antenna assembly, guides the antenna assembly to the top of the support member until the locating portion sits over a lip of the end of the support member. In another embodiment the locating portion passes into or on an aperture or formation provided on a side wall of the support member.

In one embodiment, said support member is a pole with an aperture at at least the top end.

Typically, said antenna assembly comprises an antenna dish, data processing means, an arm on which the data processing means are located, and a mounting means and clamping means which engage the assembly to the support member.

Typically, the apparatus and data processing means are capable of at least receiving data signals from a remote location and in certain embodiments may also be capable of transmitting data signals to one or more remote locations.

Figure 1B:
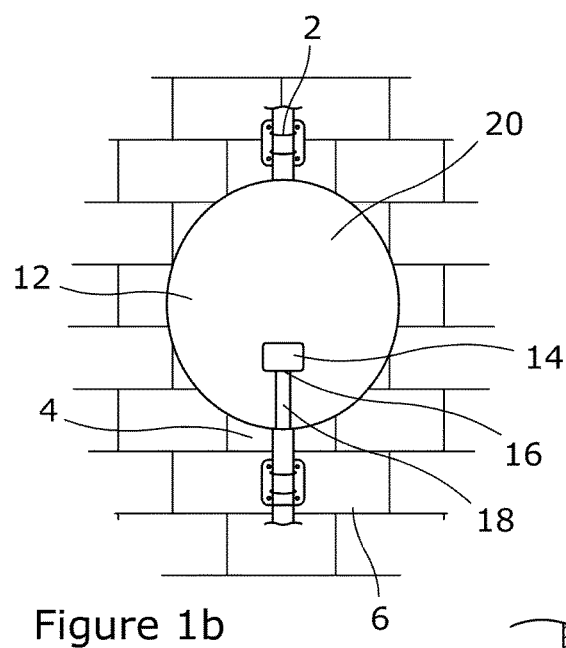
Figure 3:
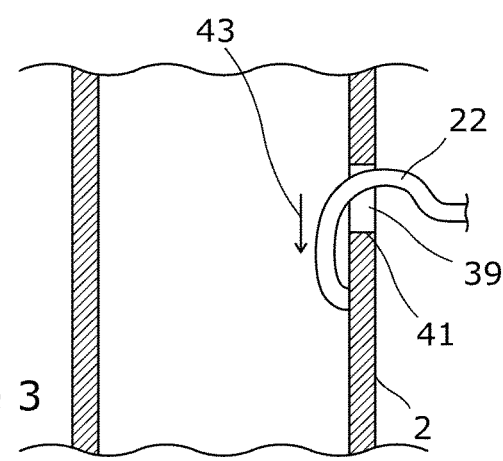
Figure 2A:
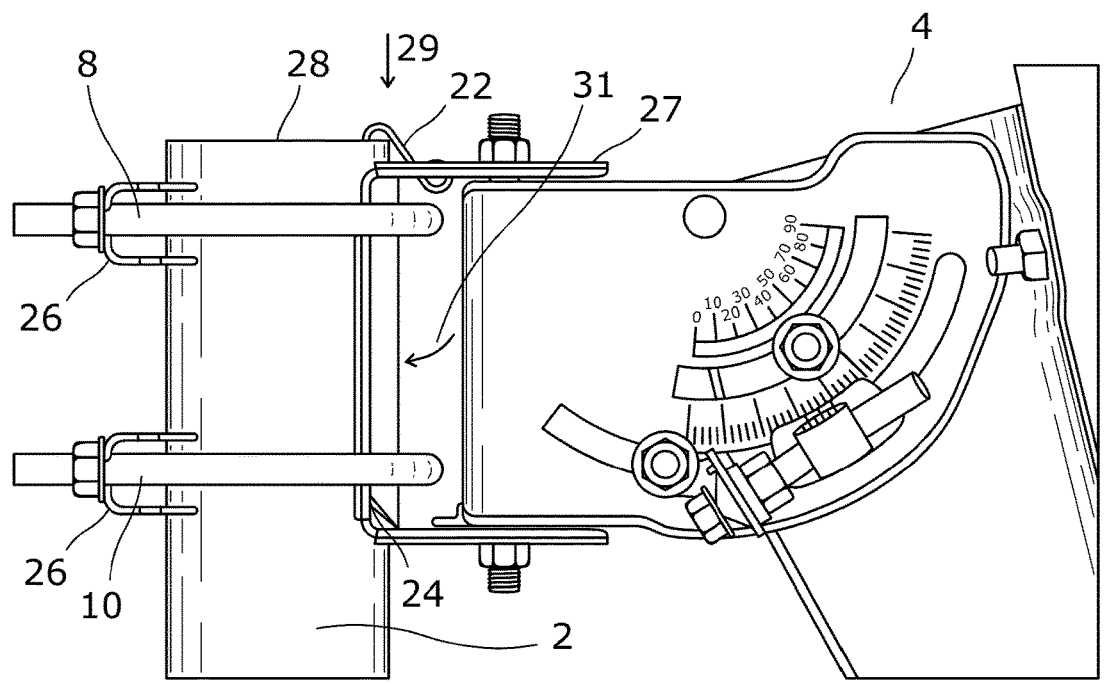
Figure 2B:
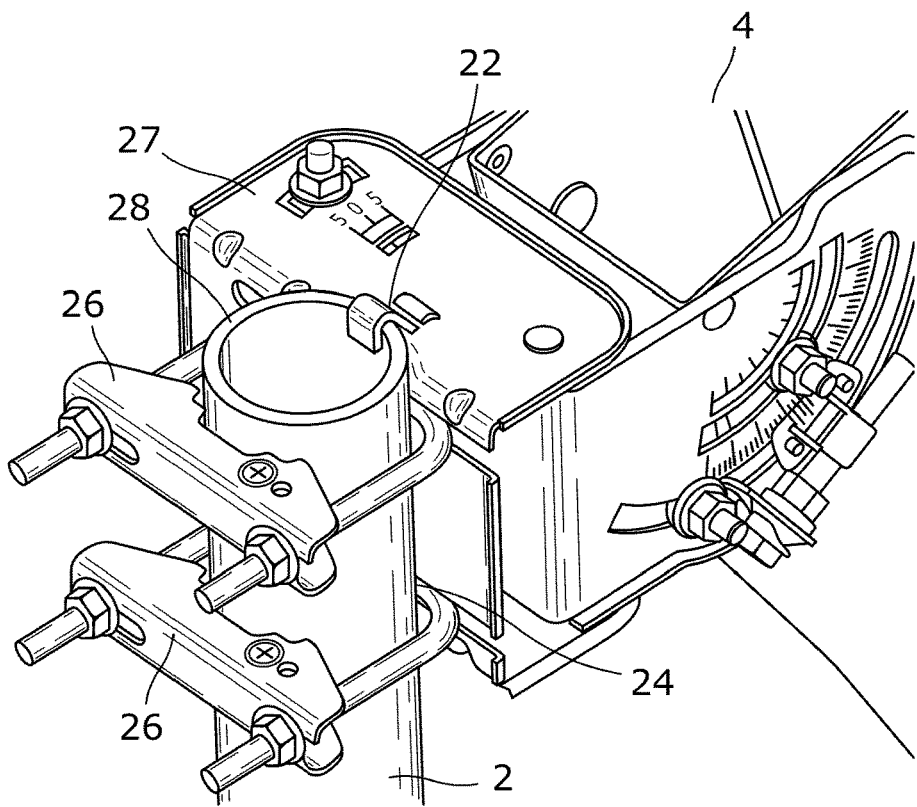

Specific embodiments of the invention are now described with reference to the accompanying drawings, wherein:

FIGS. 1a-b illustrate schematically an antenna assembly located in position;

FIGS. 2a and b illustrate in detail the provision of the location portion of the antenna assembly with the support member in accordance with one embodiment of the invention; and FIG. 3 illustrates a further embodiment of the location portion and a cross section of the support member.

Referring firstly to FIGS. 1a and b there is provided a support member 2 to which an antenna assembly 4 is to be located. The support member 2 is secured to a support surface in the form of a wall 6 of a building and/or the like. The support member in this embodiment is provided in the form of a pole and receives thereon first and second clamping means 8, 10 which are typically U or V shaped members which pass around the pole 2 and plates 24,26 are then tightened onto the pole 2 by the tightening of nuts on threaded portions of the U or V shaped members to secure the same in a fixed position. However, until the clamping means are sufficiently clamped to the pole 2 so as to fix the same in position then, conventionally, it is found that the clamping means are susceptible to sliding down the pole under the influence of gravity in the direction of arrow 25 so that the antenna assembly is then not located on the support member at the required position for optimum receipt of data signals.

The antenna assembly 4 typically includes an antenna dish 12, and data processing means 14 mounted at the free end 16 of an arm 18 which depends outwardly from the front surface 20 of the antenna dish 12 to receive data signals reflected from the front surface of the antenna dish 12 and the apparatus may also be capable of transmitting data signals therefrom. A mounting means bracket 27 is provided on the rear face of the antenna dish 12 and which allows the relative position of the antenna dish with respect to the remainder of the assembly to be adjusted, once installed.

Typically, the installer will attach the pole 2 to the wall support surface or ground support surface prior to attachment of the antenna assembly and once the pole is located in position, the installer can carry the antenna assembly and present the same to the pole and tightens the clamping means around the pole so as to position the antenna assembly as shown in FIGS. 1a and b, for subsequent operation. In accordance with the invention, and with reference to FIGS. 2a and b, when the antenna assembly 4 is first presented to the pole 2 the same is positioned in the direction of arrow 29 so that a locating portion 22 on the mounting means bracket 27 and, in the form of a hook or clip, is located as shown so that the same lies on, and clips over, the top edge 28 of the pole 2 and passes into the aperture in the interior of the pole, as shown.

Thus, when the locating portion 22 is in position as shown in FIGS. 2a and b the antenna assembly 20 is located at the correct position and correct angle once the remainder of the antenna assembly bracket 27 is positioned against the pole by the installer, holding onto the antenna assembly, moving the bracket 27 towards the pole 2 as indicated by arrow 31. The antenna assembly is then held in position by the location of the locating portion 22 on the support member 2, and the installer is then free to release the antenna assembly which is now supported via the locating portion and pole 2 in position.

The clamping means 8,10 can then be assembled and passed around the pole and tightened so to secure and fix the antenna assembly in a clamped engagement on the pole. The position of the antenna assembly around the support member 2 can be adjusted and using adjustment means 30,32 on the antenna assembly 4 the location and orientation of the antenna dish 12 can be adjusted to suit the specific location of installation.

FIG. 3 illustrates an alternative embodiment in which the locating portion 22 is again provided as a hook formation but in this embodiment the same is passed through an aperture 39 in the side wall of the support member 2 which is hollow at at least the location of the aperture 39 and, when lowered in the direction of arrow 43 the locating portion 22 engages with the lower edge 41 of the aperture 39 and thereby supports the weight of the antenna assembly while the clamping means are engaged and the location of the antenna dish 12 adjusted.

There is therefore provided apparatus and a method to allow the secure and efficient location of the antenna assembly with a support member.

The invention claimed is:

1. Apparatus, said apparatus comprising:
an antenna assembly including at least one clamping means to secure the antenna assembly to a support member at a required position, said at least one clamping means provided to locate and engage with the support member to secure the antenna assembly, and wherein the antenna assembly includes a locating portion to locate with the support member to substantially retain the at least one clamping means and/or antenna assembly in the required position with respect to the support member, whilst the said at least one clamping means is operated by a user to be engaged with the support member to fix the antenna assembly in position on the support member, wherein the locating portion is a hook formation suitable for passing through an aperture formed in a side wall of the support member such that weight of the antenna assembly is supported by engagement of the locating portion with an inner surface of the support member while the at least one clamping means is being operated by the user.

2. Apparatus according to claim 1 wherein adjustment means allow adjustment of the position of the antenna dish when the antenna assembly is fixed to the support member.

3. Apparatus according to claim 1 wherein when the locating portion is in position on the support member, the antenna assembly is temporarily retained in position by the locating portion.

4. Apparatus according to claim 1 wherein the position of the locating portion with respect to the support member is selected so as to ensure that the antenna assembly is located at the required location on the support member when the locating portion is located with the support member.

5. Apparatus according to claim 1 wherein the antenna assembly comprises an antenna, data processing means, an arm on which the data processing means are located, and a bracket.

6. Apparatus according to claim 5 wherein the data processing means are capable of at least receiving data signals from a remote location.

7. A method for installing an antenna assembly on a support member, said method comprising the step of placing at least one clamping means of the antenna assembly in position on the support member, operating the said at least one clamping means so as to clamp the antenna assembly in engagement with the support member, and wherein at least prior to engaging the clamping means with the support member, a locating portion of the antenna assembly is located with an aperture formed in a side wall of the said support member such as to locate and retain the antenna assembly in location with the support member, wherein the locating portion is a hook formation and weight of the antenna assembly is supported by engagement of the locating portion with an inner surface of the support member.

8. A method according to claim 7 wherein with the locating portion retaining the antenna assembly and support member in relative positions, the clamping means are operated to clamp the antenna assembly to the support member.

9. A method according to claim 7 wherein an installer, when presenting the antenna assembly to the support member, guides the antenna assembly to a top of the support member until the locating portion locates over the lip of an end of the support member.

10. A method according to claim 7 wherein the position of a dish of the antenna assembly is adjusted with respect to the clamping means of the antenna assembly.

11. A method according to claim 7 wherein the support member is a hollow pole.

* * * * *